US012783142B2

(12) United States Patent
Gorrle et al.

(10) Patent No.: US 12,783,142 B2
(45) Date of Patent: Nov. 3, 2026

(54) NON-DESTRUCTIVE LOGICAL BLOCK ADDRESS SIZE CHANGE WITH A FORMAT COMMAND

(71) Applicant: Sandisk Technologies, Inc., Milpitas, CA (US)

(72) Inventors: Dhanunjaya Rao Gorrle, Bangalore (IN); Prabhukumar Sivamoorthy, Bangalore (IN); Yaswanth Koyyalamudi, Bangalore (IN); Kotaiah Chinnam, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 19/009,274

(22) Filed: Jan. 3, 2025

(65) Prior Publication Data

US 2026/0195062 A1 Jul. 9, 2026

(51) Int. Cl.
*G06F 3/06* (2006.01)

(52) U.S. Cl.
CPC ............ *G06F 3/064* (2013.01); *G06F 3/0619* (2013.01); *G06F 3/0652* (2013.01); *G06F 3/0679* (2013.01)

(58) Field of Classification Search
CPC ...... G06F 3/064; G06F 3/0619; G06F 3/0652; G06F 3/0679
See application file for complete search history.

(56) References Cited

U.S. PATENT DOCUMENTS 6,330,653 B1 * 12/2001 Murray .................. G06F 16/10 711/6
10,402,092 B2 9/2019 Dewitt
11,307,992 B2 4/2022 Lin
11,947,816 B1 4/2024 Das
11,983,119 B2 5/2024 Frolikov
2006/0005074 A1 * 1/2006 Yanai .................... G06F 3/0619 714/6.32
2024/0086092 A1 3/2024 Lian

OTHER PUBLICATIONS

Handyman Savage "Increase your hard disk vol. cluster size without losing your files" Youtube video at Chapter 2, time 1:22 https://www.youtube.com/watch?v=bF0sf2D0gA8 (Year: 2021).*
Irene, "How to Change Cluster Size", Mini Tool Partition Wizard, 2020, https://web.archive.org/web/20240516073936/https://www.partitionwizard.com/help/change-cluster-size.html (Year: 2020).*

* cited by examiner

*Primary Examiner* — Eric Cardwell
(74) *Attorney, Agent, or Firm* — Arlene Neal; NEAL BLIBO LLC

(57) ABSTRACT

A storage device may ensure that data stored within a namespace is preserved when reformatting a logical block address (LBA) size associated with the namespace. The storage device includes a memory with blocks to store data. A block may be assigned an LBA and a group of LBAs may be associated with a namespace. A controller may receive a command to reformat a LBA size for the namespace from a first format size to a second format size. The controller may determine that an option to safeguard data in the namespace during reformatting is set. The controller may execute data relocation from blocks associated with the namespace prior to the reformatting. The controller may reformat the namespace to the second LBA format size and restore the data to the blocks associated with the namespace, such that the restored data is stored in the second LBA format without host involvement.

20 Claims, 5 Drawing Sheets

NON-DESTRUCTIVE LOGICAL BLOCK ADDRESS SIZE CHANGE WITH A FORMAT COMMAND

BACKGROUND OF THE INVENTION

A storage device may be communicatively coupled to a host and to non-volatile/persistent memory including, for example, a NAND flash memory device on which the storage device may store data received from the host. The memory device may include multiple dies which may be divided into physical blocks and the storage device may store data in blocks on the memory device. When data is being programmed on the memory device, a controller on the storage device may perform chunking on the data, wherein the controller may break up or accumulate the host data into uniform-sized chunks before sending the data to the memory device for storage. Depending on the configuration of the storage device, the controller may break up the host data into chunks of, for example, 512 bytes (B), 4 kilo-bytes (KB), 8 KB, etc.

Data stored in blocks on the memory device may be assigned a logical block address (LBA) that provides a unique identifier to the individual block. The LBAs may be mapped one-to-one to physical addresses on the memory device. The one-to-one LBA to physical address mappings may be stored in a logical-to-physical (L2P) table. The controller may manage the mapping of LBAs to physical locations within the memory device, providing an abstraction to the host. As such, when the host accesses data stored in the blocks on the memory device, the host may address the data using the LBAs and the storage device may use the mappings in the L2P table to translate LBAs to physical locations on the memory device.

Data may be organized and stored in namespaces, i.e., sections that may serve as logically divided portions of the physical storage capacity, allowing for isolated and independent functioning. The formatted size of a namespace may be the total addressable space within that namespace and the formatted size may be defined during the formatting or initialization of the storage device. During initialization of the storage device, the storage device may identify the chunk sizes it supports, and the host may direct the storage device to format a namespace according to a chunk size selected by the host. For example, the storage device may indicate that it supports 512 B or 4 KB chunks within a block that may be assigned an LBA. The host may, for example, direct the storage device to format the namespace for 4 KB. After a namespace is formatted, the host may identify the formatted size as the available space for data storage within the namespace and data stored in blocks associated with the namespace may be accessed with the respective LBAs. For example, if a namespace has a formatted size of 1 TB and the LBAs are associated with blocks including 4 KB chunks of data, the namespace may include approximately 250,000,000 LBAs (i.e., 1 TB/4 KB).

To improve overall performance, the host may adjust the logical block addressing size within a namespace. For example, the host may issue a command (for example, a Non-Volatile Memory Express (NVMe) format command) with a desired/new LBA size for the namespace. Execution of the format command may cause erasure of the data stored on the memory locations associated with the namespace. To ensure that data loss is avoided when reformatting the LBA size in a namespace, the host may first issue a command to back-up the data by, for example, instructing the storage device to copy the data from memory locations associated with the namespace to an alternate storage medium. The host may then issue the format command with an intended/new LBA format size. In response to the format command, the controller may erase the data stored on memory locations associated with LBAs within the namespace and reformat the namespace with the new LBA format size. The host may thereafter instruct the storage device to restore the data copied to the alternate storage medium to the physical blocks associated with the reformatted namespace, ensuring that the data may now be associated with a reformatted LBA structure. Using this approach in circumstances requiring safeguarding data integrity while changing the formatted LBA size of a namespace, the host is responsible to ensure that data stored on the memory device is preserved.

SUMMARY OF THE INVENTION

In some implementations, a storage device may ensure that data stored within a namespace is preserved when reformatting a logical block address (LBA) size associated with the namespace. The storage device includes a memory device including blocks to store data. A block may be assigned an LBA and a group of LBAs may be associated with a namespace. A controller in the storage device may receive a command to reformat a LBA size for the namespace from a first LBA format size to a second LBA format size. The controller may determine that an option to safeguard data in the namespace during reformatting is set in the command. Based on the option, the controller may execute data relocation from blocks associated with the namespace prior to the reformatting. The controller may reformat the namespace to the second LBA format size and restore the data to the blocks associated with the namespace, such that the restored data is stored in the second LBA format without a host involvement with the data relocation and restoration.

In some implementations, a method is provided on the storage device for ensuring that data stored within a namespace is preserved when reformatting the LBA size associated with the namespace. The method includes receiving a command to reformat a LBA size for the namespace from a first LBA format size to a second LBA format size. The method also includes determining that an option to safeguard data in the namespace during reformatting is set in the command. The method further includes executing data relocation from blocks associated with the namespace prior to the reformatting, reformatting the namespace to the second LBA format size, and restoring the data to the blocks associated with the namespace. The restored data is stored in the second LBA format without a host involvement with the data relocation and restoration.

In some implementations, a method is provided for ensuring that data stored within a namespace is preserved when reformatting the LBA size associated with the namespace. The method includes receiving a command to reformat a LBA size of the namespace from a first LBA format size to a second LBA format size. The method also includes determining that an option to erase the user data in the namespace is set in the command and retrieving an enabled hint from the command. The method further includes executing data relocation from blocks associated with the namespace prior to the reformatting, reformatting the namespace to the second LBA format size, and restoring the data to the blocks associated with the namespace. The restored data is stored in the second LBA format without any host involvement with the relocation and restoration.

Figure 1:
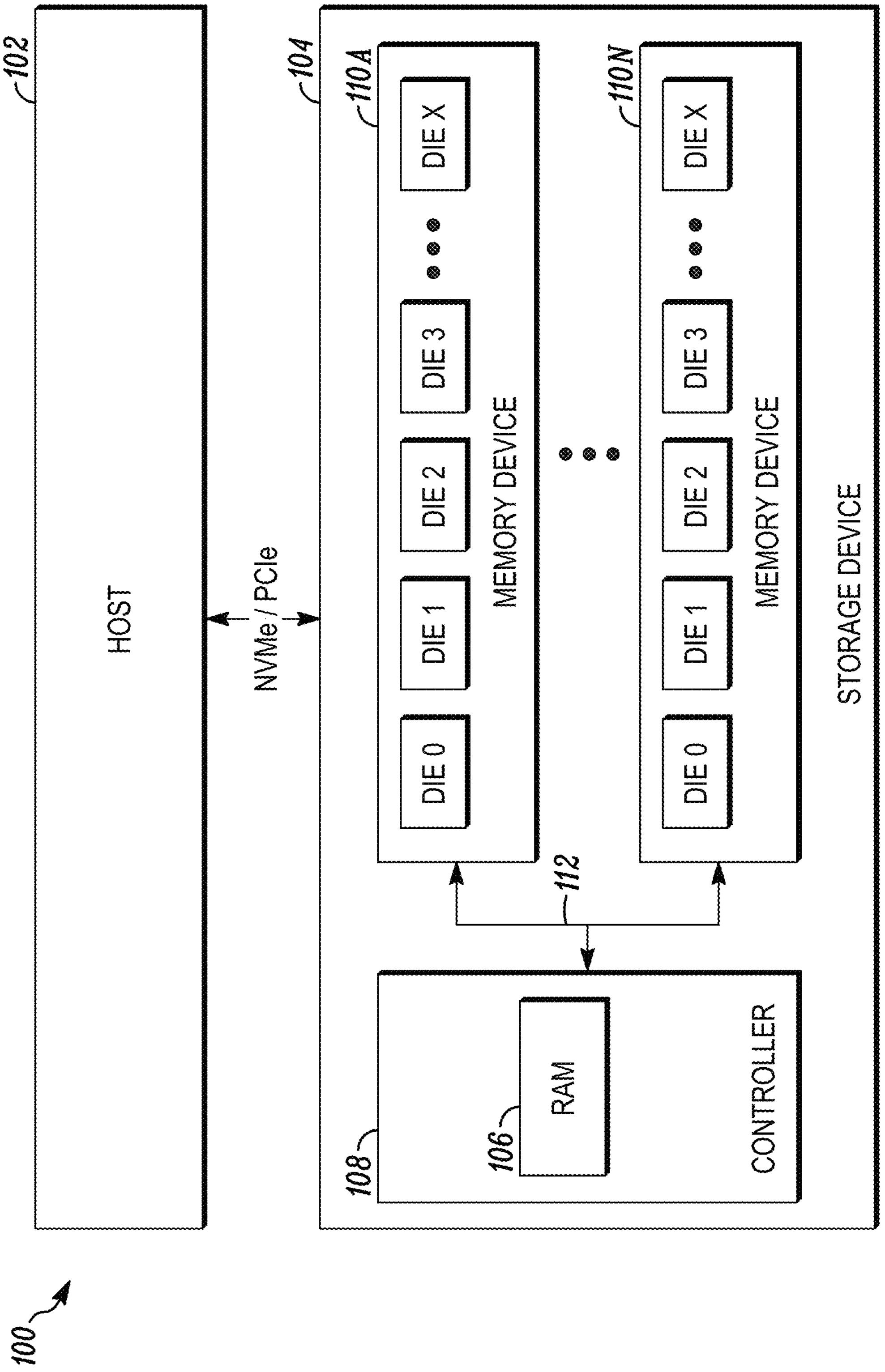
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 may include a host 102 and a storage device 104 that may be in the same physical location as components on a single computing device or on different computing devices that are communicatively coupled. Storage device 104 may communicate with host 102 via a Non-Volatile Memory Express (NVMe) protocol over a peripheral component interconnect express (PCIe) bus, and the like. Host 102 may include additional components (not shown in this figure for the sake of simplicity).

Storage device 104 may include a random-access memory (RAM) 106, a controller 108, and one or more non-volatile memory devices 110*a*-110*n* (referred to herein as the memory device(s) 110). Storage device 104 may be, for example, a solid-state drive (SSD). RAM 106 may be, for example, static RAM (SRAM) or dynamic RAM (DRAM) that be used to temporarily store data on storage device 104.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may monitor memory device 110 and may execute garbage collection and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include one or more dies (for example, DIE 0-DIE X) connected to a memory bus 112 including data lines and chip enable lines. The dies may be divided into blocks to store the data. Memory device 110 may be included in storage device 104 or may be otherwise communicatively coupled to storage device 104. FIG. 1 is provided as an example.

Memory device 110 may include one or more over-provisioning areas (not shown) that may be customizable to meet performance and endurance requirements on storage device 104. In an example, two-five percent of the total capacity of memory device 110 may be allocated for over-provisioning. Therefore, in a one-terabyte storage device, approximately two to five gigabytes (GB) might be set aside for over-provisioning. The over-provisioned area(s) may serve multiple purposes on storage device 104 and the over-provisioned area(s) may not be directly accessible to host 102. For example, an over-provisioned area may be used during garbage collection, relocation, and other maintenance operations on storage device 104. In one example, the over-provisioned area(s) may be used for temporary storage during relocation operations on storage device 104, wherein controller 108 may temporarily transfer data stored in a first physical location on memory device 110 to the over-provisioned area(s) and transfer the data from the over-provisioned area(s) to a second physical location on memory device 110. As such, during a relocation operation, controller 108 may play a pivotal role in repositioning data within memory device 110 to, for example, ensure an equitable distribution of write/erase cycles among memory cells which may help to expand the lifespan of storage device 104. In another example, when memory device 110 experiences block deterioration that may result in bad blocks over time, the over-provisioned area(s) may function as a reserve space where controller 108 may swap spare good blocks in the over-provisioned area(s) with the bad blocks and remap the LBAs associated with the bad blocks to point to the spare good blocks in the over-provisioned area(s) that are being used to replace the bad block. This process may aid in maintaining data integrity and the overall health of storage device 104.

In circumstances requiring a change in the formatted LBA size of a namespace, controller 108 may safeguard data stored in memory device 110 when host 102 issues a command to reformat the LBA size in a namespace, rather than relying on host 102 to ensure the data preservation. When host 102 issues a format command (for example, a NVMe format command or another format command) to reformat the size of data chunks in blocks associated with LBAs within a namespace, before initiating the format process on the namespace, controller 108 may execute a data relocation process. During the relocation process, controller 108 may relocate data associated with the namespace to over-provisioned area(s) using internal relocation operations.

Consider an example wherein controller 108 fetches a format command (for example, an NVMe format command) from a submission queue. The format command may instruct controller 108 to reformat a namespace from a first LBA format size to a second LBA format size. For example, the format command may instruct controller 108 to reformat a namespace from having 512 B chunks in the blocks associated with LBAs (i.e., first LBA format size) to the second LBA format size (i.e., blocks associated with the LBAs including 4 KB chunks). The format command may include options including, for example, a first option to erase the user data in the namespace, a second option to erase the security keys associated with the user data in the namespace, and/or a third option to maintain the user data when reformatting the namespace from the first LBA format size to the second LBA format size. In another example, the format command may include the first option to erase the user data in the namespace, the second option to erase the security keys associated with the user data in the namespace, and an enabled hint that instructs controller 108 to preserve existing data while changing LBA format size for a namespace. The hint may be enabled by setting a field in the command to a predefined value.

In executing the format command with the third option or based on the enabled hint, controller 108 may execute a relocation process to move the data stored using the first LBA format size from blocks associated with the namespace to the over-provisioned area(s). Controller 108 may update the L2P mapping to reflect the movement of the data to the over-provisioned area(s). Controller 108 may erase the data in the blocks associated with the namespace and reformat the blocks to the second LBA format size. Controller 108 may rewrite the data in the second LBA format to the blocks associated with the namespace and update the L2P mapping to reflect the restoration of the data to the blocks associated with the namespace. Controller 108 may ensure that user data in all blocks within the namespace are moved to the over-provisioned area(s), that all blocks within the namespace are reformatted to the second LBA format size, and that the user data is copied from the over-provisioned area(s) to the blocks within the namespace, when the format command instructs controller 108 to reformat a namespace from a first LBA format size to a second LBA format size. Controller 108 may thus carry out the relocation, reformatting, data rewriting/restoration, and mapping table updates for each block within the namespace, ensuring a comprehensive and consistent modification across the namespace. This approach optimizes the process of reformatting the LBA size of a namespace by performing data relocation within storage device 104, by ensuring data preservation when the LBA size is reformatted and reducing the burden on host 102 to preserve the data in a namespace that is reformatted.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
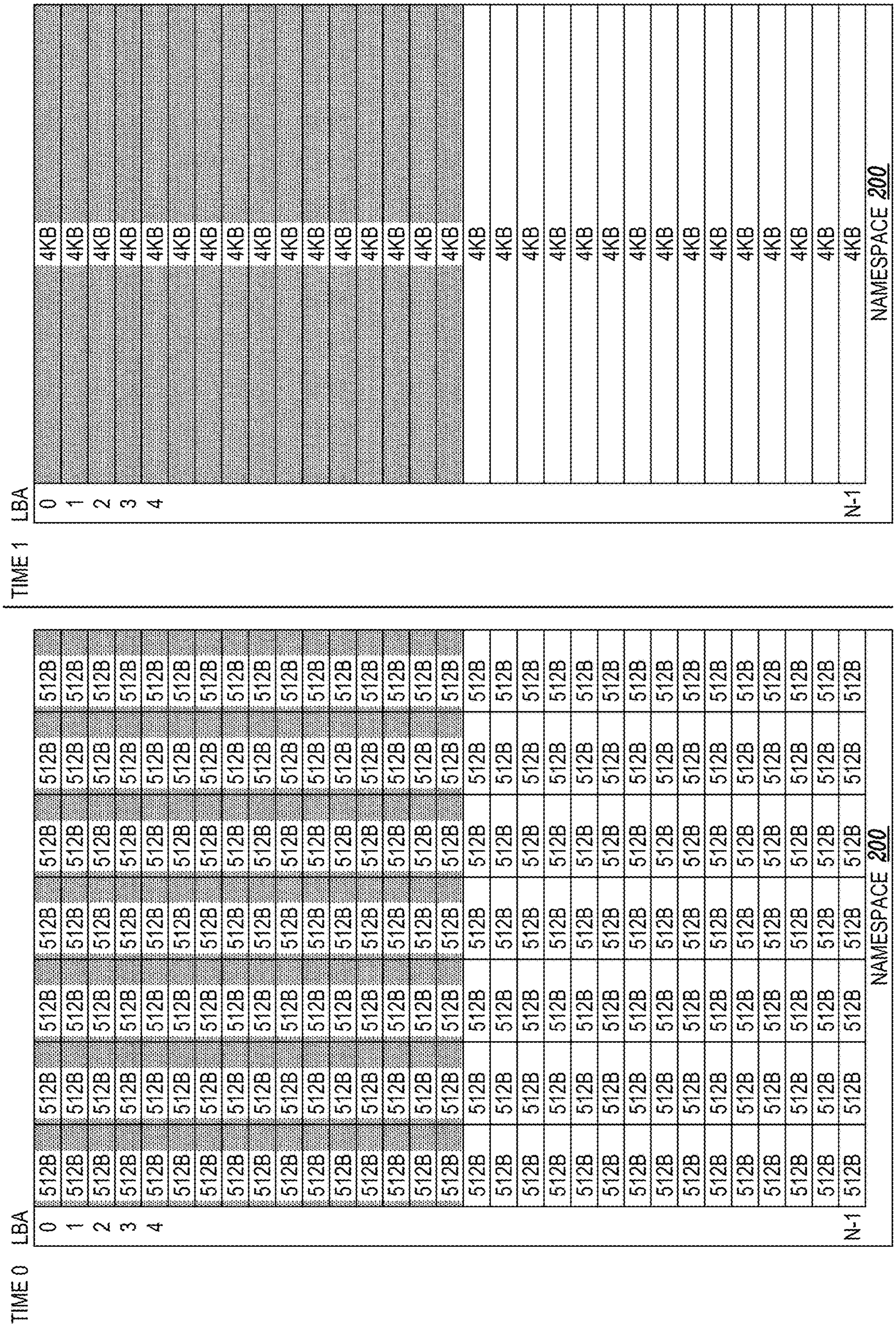
FIG. 2 is an example block diagram showing a namespace being reformatting within a storage device in accordance with some implementations.

FIG. 2 is an example block diagram showing a namespace being reformatting within a storage device in accordance with some implementations. Namespace 200 may include a collection of LBAs (i.e., 0-N−1) that may be accessible to host 102. Controller 108 may use an identifier associated with namespace 200 to provide host 102 access to namespace 200 that may be formatted according to a first LBA format size. For example, at an initial period (TIME 0), host 102 may instruct controller 108 to format namespace 200 in a first LBA format size such that data may be stored in 512 B chucks. Controller 108 may write data to the blocks associated with the LBAs in namespace 200 (as shown by the shaded areas in namespace 200 that is shaded to denote data storage).

At a subsequent period (TIME 1), host 102 may send a format command with an option to preserve the data in namespace 200 and to reformat namespace 200 to a second LBA format size. The second LBA format size may include data stored in 4 KB chucks. When controller 108 receives the format command, controller 108 may copy the data in the shaded section of namespace 200 to an over-provisioned area (not shown) and update the L2P mapping table to reflect the relocation of the data to the over-provisioned area. Controller 108 may reformat namespace 200 to the second LBA format size such that data may be stored in 4 KB chunks. Controller 108 may copy the data from the over-provisioned area to namespace 200, wherein the data may be copied with the second LBA format such that data may be stored in 4 KB chunks, as shown at TIME 1. Controller 108 may update the L2P mapping table to reflect the restoration of the data back to namespace 200. As indicated above FIG. 2 is provided as an example. Other examples may differ from what is described in FIG. 2.

Figure 3:
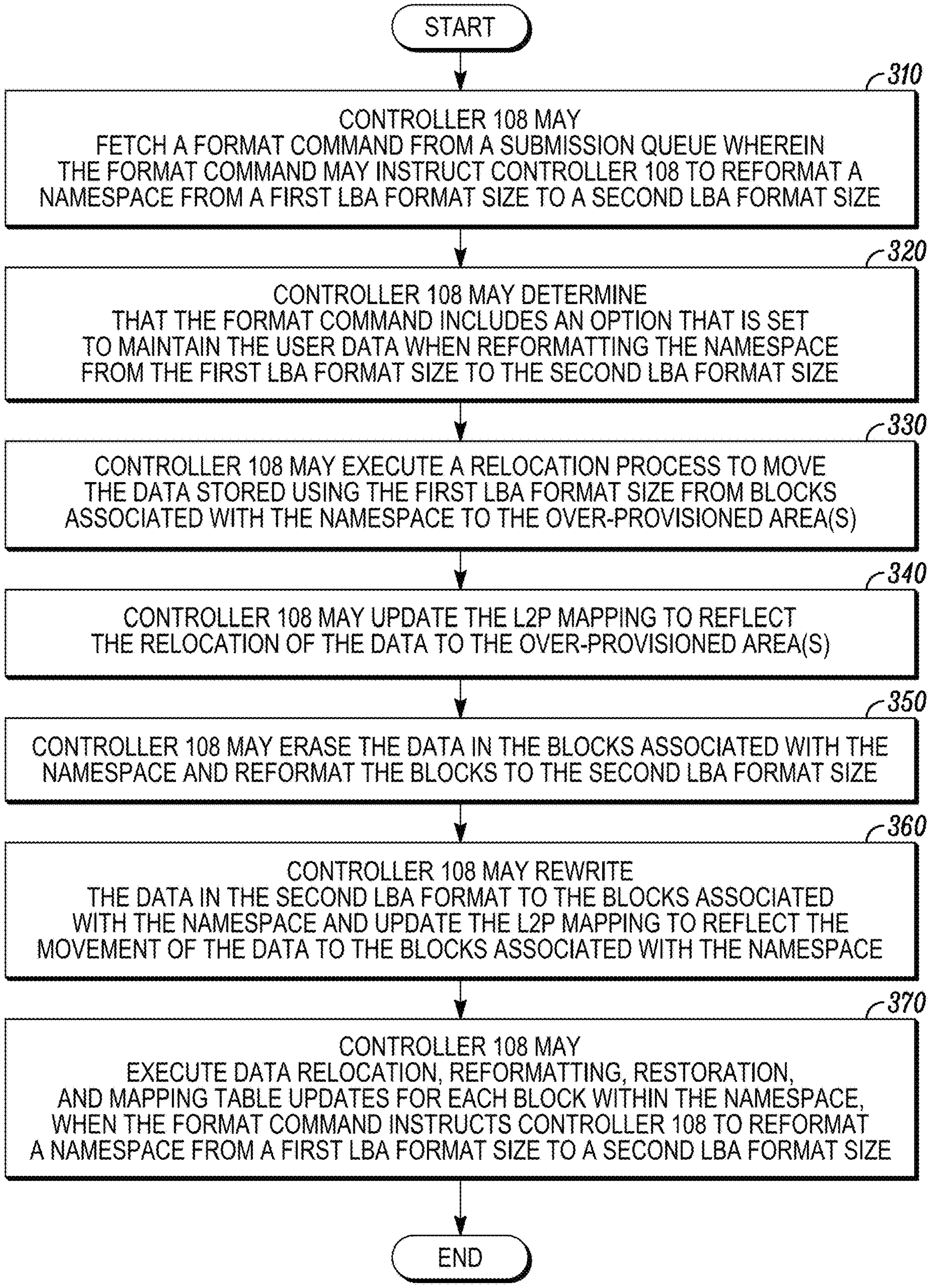
FIG. 3 is an example flow diagram for ensuring that data stored within a namespace is preserved when reformatting a LBA size associated with the namespace in accordance with some implementations.

FIG. 3 is an example flow diagram for ensuring that data stored within a namespace is preserved when reformatting a LBA size associated with the namespace in accordance with some implementations. At 310, controller 108 may fetch a format command from a submission queue wherein the format command may instruct controller 108 to reformat a namespace from a first LBA format size to a second LBA format size. At 320, controller 108 may determine that the format command includes an option that is set to maintain the user data when reformatting the namespace from the first LBA format size to the second LBA format size. At 330, controller 108 may execute a relocation process to move the data stored using the first LBA format size from blocks associated with the namespace to the over-provisioned area(s). At 340, controller 108 may update the L2P mapping to reflect the relocation of the data to the over-provisioned area(s). At 350, controller 108 may erase the data in the blocks associated with the namespace and reformat the blocks to the second LBA format size. At 360, controller 108 may rewrite the data in the second LBA format to the blocks associated with the namespace and update the L2P mapping to reflect the movement of the data to the blocks associated with the namespace. At 370, controller 108 may execute relocation, reformatting, data restoration, and mapping table updates for each block within the namespace, when the format command instructs controller 108 to reformat a namespace from a first LBA format size to a second LBA format size and preserve the data associated with the namespace during the reformatting. As indicated above FIG. 3 is provided as an example. Other examples may differ from what is described in FIG. 3.

Figure 4:
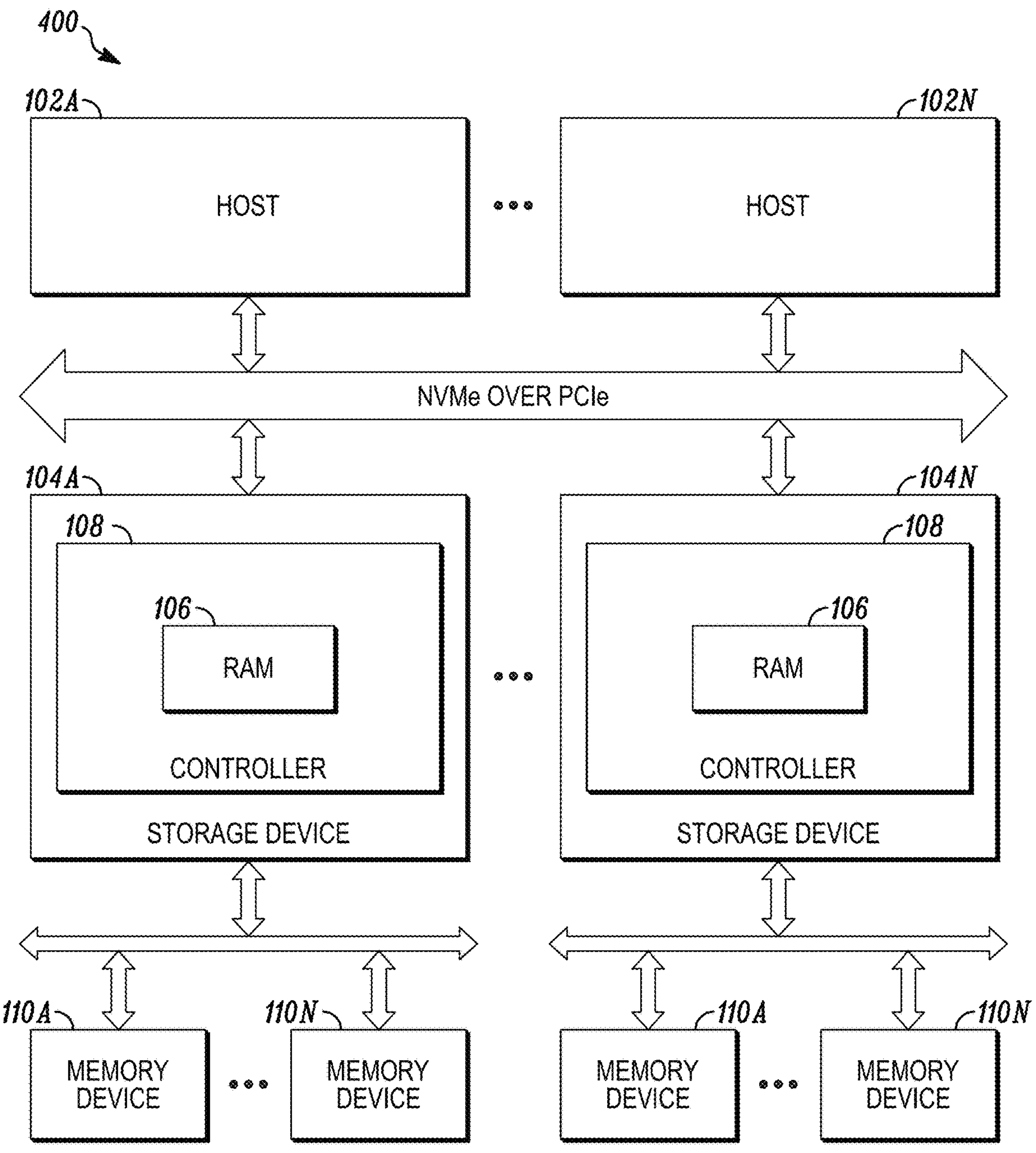
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102*n* (referred to herein as host(s) 102), and one or more storage devices 104*a*-104*n* (referred to herein as storage device(s) 104). Storage device 104 may ensure that data stored within a namespace is preserved when reformatting a LBA size associated with the namespace. Hosts 102 and storage devices 104 may communicate via Non-Volatile Memory Express (NVMe) over peripheral component interconnect express (PCI Express or PCIe), SD, or the like.

Devices of Environment 400 may interconnect via wired connections, wireless connections, or a combination of wired and wireless connections. For example, the network in FIG. 4 may include NVMe over Fabric(NVMe-oF) Internet Small Computer Systems Interface (iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
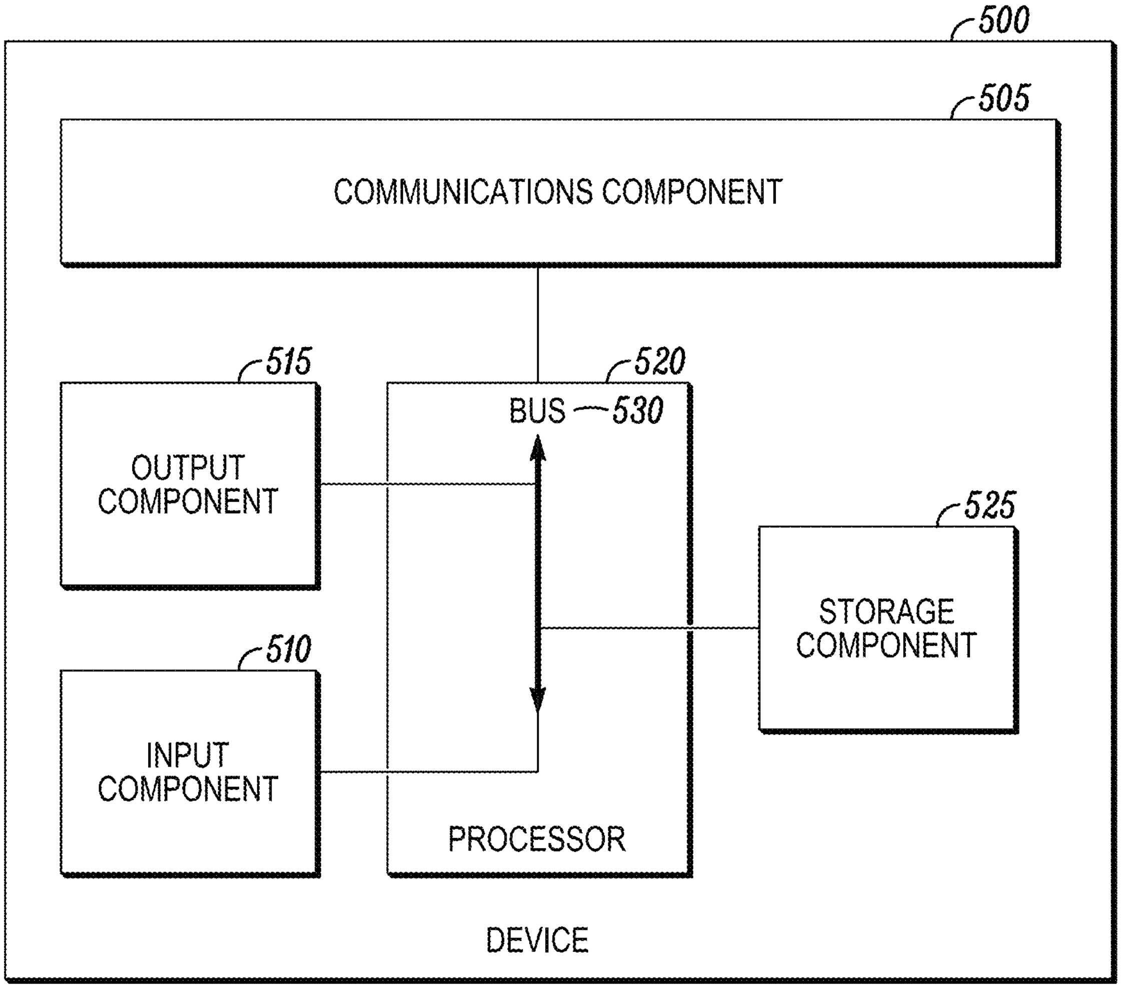
FIG. 5 is a diagram of example components of one or more devices of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, and a network/data connection port, or the like), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and network/data connection port, or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM 106), read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to ensure that data stored within a namespace is preserved when reformatting a logical block address (LBA) size associated with the namespace, the storage device comprises:

a memory device including blocks to store data, wherein a block is assigned LBA and a group of LBAs are associated with a namespace, a controller to receive a format command to reformat a LBA size for the namespace from a first LBA format size to a second LBA format size, to determine that an option to safeguard data in the namespace during reformatting is set in the format command, to execute data relocation from blocks associated with the namespace prior to the reformatting based on the option and without receiving a host command to relocate the data, to reformat the namespace to the second LBA format size, and to restore the data to the blocks associated with the namespace based on the option and without receiving a host command to restore the data, the restored data being stored in the second LBA format without a host involvement with the data relocation and restoration.

2. The storage device of claim 1, wherein the memory device includes an over-provisioned area, wherein the controller uses the over-provisioned area as temporary storage during the data relocation from blocks associated with the namespace prior to the reformatting.

3. The storage device of claim 1, wherein the controller updates a mapping table to reflect the data relocation and restoration of the data to blocks associated with the namespace.

4. The storage device of claim 1, wherein the controller erases the data from blocks associated with the namespace in reformatting the namespace to the second LBA format size.

5. The storage device of claim 1, wherein the controller executes the data relocation, reformatting, data restoration, and mapping table updates for blocks within the namespace without the host involvement with the data relocation and the data restoration.

6. The storage device of claim 1, wherein the first LBA format size includes one of 512-byte chunks of data in the block, four kilo-byte chunks of data in the block, and another byte size chunks of data in the block, wherein the first LBA format size is different from the second LBA format size.

7. The storage device of claim 1, wherein the second LBA format size includes one of 512-byte chunks of data in the block, four kilo-byte chunks of data in the block, and another byte size chucks of data in the block, wherein the first LBA format size is different from the second LBA format size.

8. The storage device of claim 1, wherein the option directs the controller to maintain user data when reformatting the namespace from the first LBA format size to the second LBA format size.

9. The storage device of claim 1, wherein the controller receives the command to reformat the LBA size for the namespace from the host.

10. The storage device of claim 1, wherein the controller obtains the command from a submission queue.

11. A method in a storage device for ensuring that data stored within a namespace is preserved when reformatting a logical block address (LBA) size associated with the namespace, the storage device comprises a controller to execute the method comprising:

receiving a format command to reformat a LBA size for a namespace from a first LBA format size to a second LBA format size;

determining that an option to safeguard data in the namespace during reformatting is set in the format command;

executing data relocation from blocks associated with the namespace prior to the reformatting based on the option and without receiving a host command to relocate the data;

reformatting the namespace to the second LBA format size; and restoring the data to the blocks associated with the namespace based on the option and without receiving a host command to restore the data, the restored data being stored in the second LBA format without a host involvement with the data relocation and restoration.

12. The method of claim 11, further comprising using an over-provisioned area as temporary storage during the data relocation from the blocks associated with the namespace prior to the reformatting.

13. The method of claim 11, further comprising updating a mapping table to reflect the data relocation and restoration of the data to the blocks associated with the namespace.

14. The method of claim 11, further comprising erasing the data from the blocks associated with the namespace in reformatting the namespace to the second LBA format size.

15. The method of claim 11, further comprising executing the data relocation, reformatting, data restoration, and mapping table updates for blocks within the namespace without the host involvement with the data relocation and the data restoration.

16. The method of claim 11, further determining comprises determining that user data is to be maintained when reformatting the namespace from the first LBA format size to the second LBA format size.

17. The method of claim 11, further comprising receiving the command to reformat the LBA size for the namespace from the host.

18. The method of claim 11, further comprising obtaining the command from a submission queue.

19. A method in a storage device for ensuring that data stored within a namespace is preserved when reformatting a logical block address (LBA) size associated with the namespace, the storage device comprises a controller to execute the method comprising:

receiving a format command to reformat a LBA size of a namespace from a first LBA format size to a second LBA format size;

determining that an option to erase user data in the namespace is set in the format command;

retrieving an enabled hint from the format command;

executing data relocation from blocks associated with the namespace prior to the reformatting based on the option and without receiving a host command to relocate the data;

reformatting the namespace to the second LBA format size; and restoring the data to the blocks associated with the namespace based on the option and without receiving a host command to restore the data, the restored data being stored in the second LBA format without a host involvement with the data relocation and restoration.

20. The method of claim 19, further comprising determining that the hint is enabled when a field in the command is set to a predefined value, wherein the enabled hint provides instruction to preserve the user data in the namespace while reformatting the LBA size of the namespace.

* * * * *